Dec. 12, 1967    R. L. WHITMAN ET AL    3,357,595
METER HOUSING WITH WINDOW
Filed Feb. 25, 1966    2 Sheets-Sheet 1
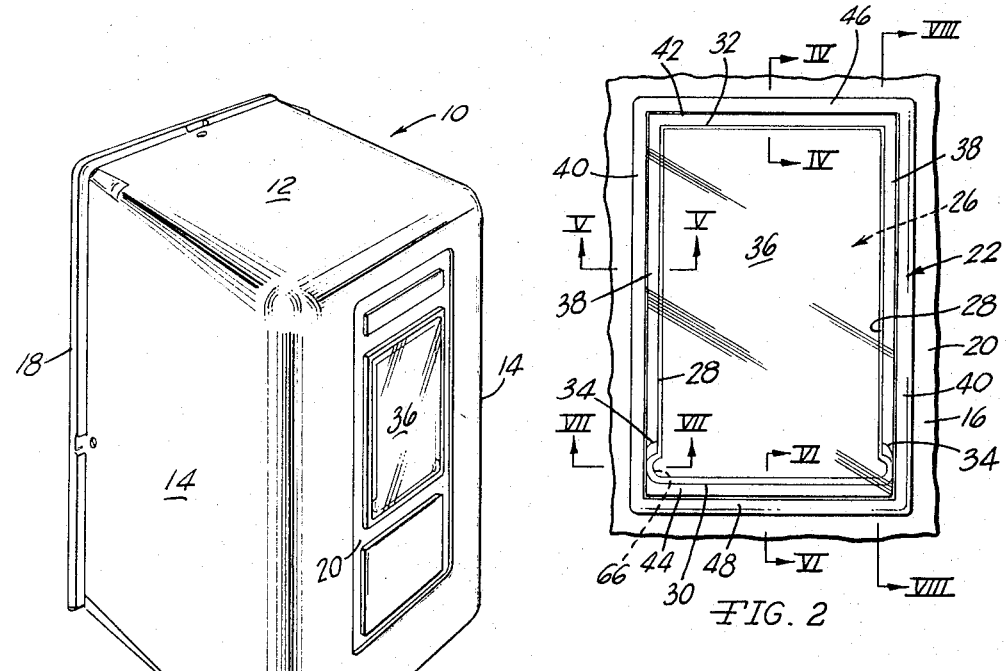
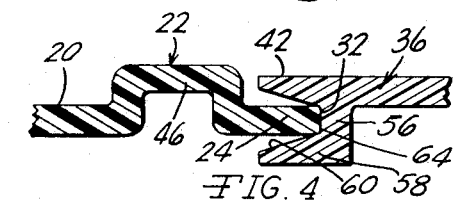
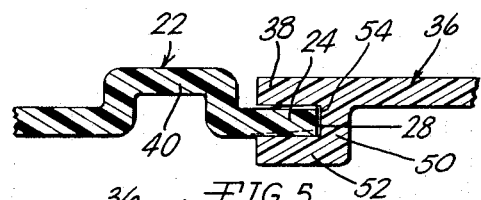
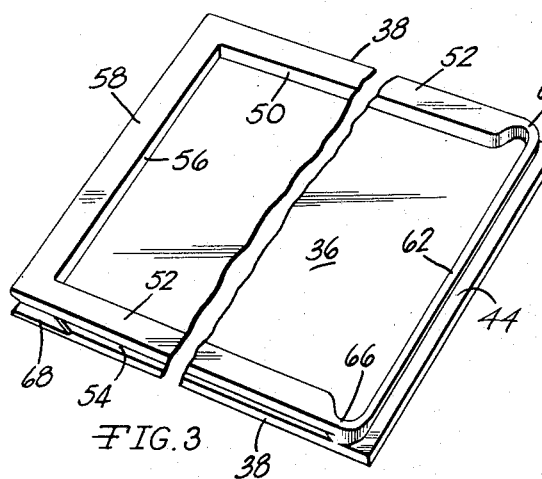
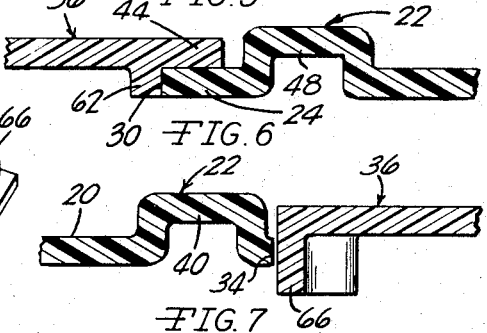
INVENTORS
ROBERT L. WHITMAN
FRANK J. PERRY
BY Beaman & Beaman
ATTORNEYS

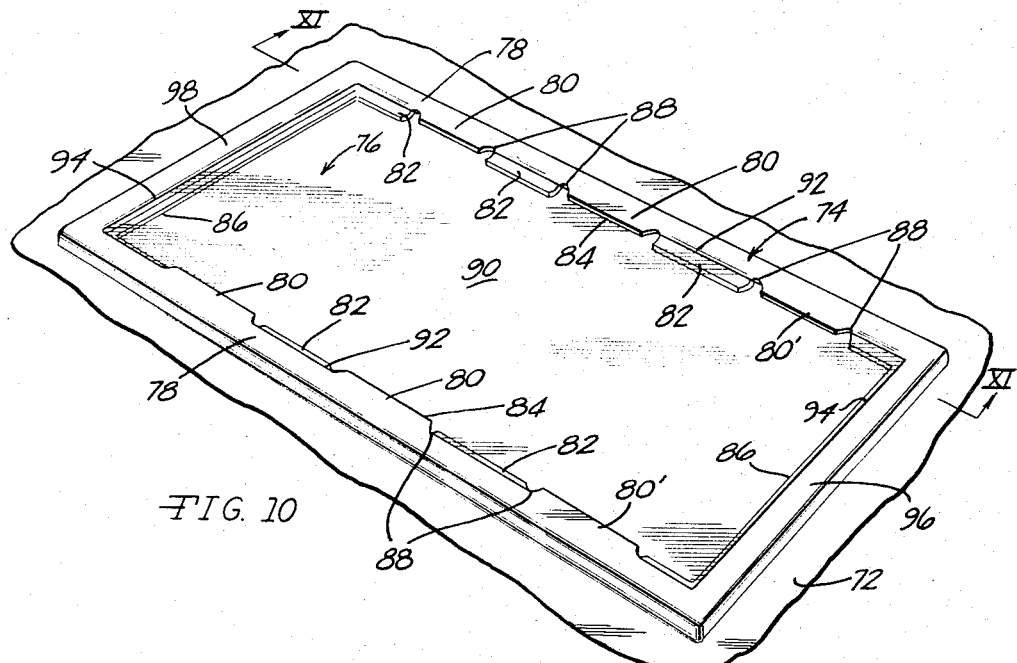

United States Patent Office 3,357,595
Patented Dec. 12, 1967

3,357,595
METER HOUSING WITH WINDOW
Robert L. Whitman, Jackson, and Frank J. Perry, Vandercook Lake, Mich., assignors to Handey Industries, Inc., Jackson, Mich., a corporation of Michigan
Filed Feb. 25, 1966, Ser. No. 530,179
10 Claims. (Cl. 220—82)

The invention pertains to housings for public utility meters, and the like, and particularly relates to meter housings having a transparent window defined therein.

It is now common practice in many localities to install public utility meters, such as for natural gas, or water, exteriorly of the building being serviced. The exterior placement of the meter facilitates reading thereof and replacement and maintenance, as meter reading and service personnel need not enter the dwelling being serviced and, in the case of natural gas meters, locating the meter and pressure regulator exteriorly of the building being serviced is desirable from a safety standpoint. As public utility meters and the asssociated piping and accessories are not of an attractive appearance, meter housings may be employed to enclose the meter and present a more attractive appearance, while simultaneously protecting the meter and associated components from the weather. As reading of the meter is periodically required, it is desirable that a window be defined in the meter housing to permit viewing of the face of the meter. The present invention pertains to this type of meter housing wherein a transparent window may be readily assembled to a meter housing and the window may be replaced, if necessary, with a minimum of effort. Yet, the window is mounted within the meter housing in such a manner as to discourage and retard tampering and unauthorized removal of the window from the housing.

In the practice of the invention, the meter housing is, preferably, formed of a synthetic, plastic material which is relatively stiff, yet deformable, and resilient within its elastic limits. The window member is substantially rigid, though bendable a limited degree without fracturing. The material of the housing is sufficiently deformable to permit deforming of the housing during installation of the window on the housing and after the window is properly located within a window opening defined on the housing, the resilient character of the housing material permits the housing to return to its original shape and retain the window member within the meter housing opening.

It is, therefore, an object of the invention to provide a meter housing having a transparent window wherein the window may be readily assembled to the meter housing in a firm and positive manner which discourages unauthorized removal of the window, yet, the window may be removed for purposes of replacement and maintenance.

Another object of the invention is to provide a meter housing having a transparent window associated therewith wherein assembly of the window to the meter housing, in accord with the practice of the invention, is made possible by the characteristics of the material of the meter housing.

A further object of the invention is to provide a meter housing having a replaceable window mounted thereon wherein the window and housing are of such configuration that the meter housing and window are self-locking when fully assembled and separate fastening, or retaining, means are not required.

Another object of the invention is to provide a meter housing having a window wherein the meter housing is formed of a stiff, yet deformable material, and these characteristics of the meter housing permit the window to be assembled to the housing in a unique manner and retain the window in position.

An additional object of the invention is to provide a meter housing having a window wherein an attractive appearing meter housing is provided, including integral portions which contribute toward appearance and strengthening of the housing, as well as serve to protect and retain the window in position.

These and other objects of the components of embodiments of the invention will be apparent from the following description and accompanying drawings wherein:

FIG. 1 is a front and side elevational view of a meter housing and window constructed in accord with the invention, FIG. 2 is a plan, enlarged, detail view of the assembled meter housing wall member opening and window of FIG. 1 in accord with the invention, FIG. 3 is a broken, underside, perspective view of the window member employed in accord with the embodiment of FIGS. 1 through 9, FIGS. 4 through 7 are enlarged, detail, elevational, sectional views taken along sections IV—IV, V—V, VI—VI, and VII—VII, respectively, of FIG. 2, FIG. 8 is an elevational, sectional view of the fully assembled window and meter housing taken along the lateral edge of the window-receiving opening along section VIII—VIII of FIG. 2, FIG. 9 is an elevational, sectional view taken during partial assembly of the window member into the meter housing window opening taken along a section line corresponding to that of section VIII—VIII of FIG. 2, FIG. 10 is an enlarged, detail, perspective view of a modification in the structure of the meter housing window-receiving opening, and window member, in accord with the invention, and FIG. 11 is an elevational, sectional view as taken along section XI—XI of FIG. 10.

The overall configuration of a meter housing of the type with which the concepts of the invention may be employed is best appreciated from FIG. 1. The meter housing 10 is of a substantially rectangular configuration including an upper portion 12, side walls 14, only one of which is visible, and a front wall member 16. Preferably, the housing 10 is open at the underside to permit the service pipes connected to the meter to enter the housing from below. The normal manner of mounting the housing 10 is to attach the housing to the exterior wall of the building being serviced by means of fasteners extending through the flange 18 defined on the walls 14 and upper portion 12. The rear side of the housing, circumscribed by the flange 18 and disposed toward the mounting surface, is open.

Preferably, the meter housing 10 is formed of a molded, vacuum-drawn sheet of thermoplastic, synthetic material. ABS polymers (acrylonitrile butadiene styrene) are suitable and are employed in the commercial embodiment. The synthetic material of the housing at normal temperatures has a relatively stiff characteristic, even when in sheet form, yet is capable of being bent or deformed a considerable degree without fracture, and the inherent resiliency of the material is such that the material, when deformed below its elastic limit, readily returns to its original configuration.

In most cases the window associated with the meter housing is formed in the outer, or front, wall member 16. The wall member 16 is of a substantially planar configuration and is provided with interconnected, rectangularly related depressions 20 formed from the material of the wall and inwardly deflected relative to the general plane thereof.

The rectangularly disposed depressions 20 formed inwardly define a rectangular ridge 22 which circumscribes an inwardly disposed rectangular portion 24 during the vacuum molding formation of the housing. The housing 10 may be molded from a sheet of material about .230 inch thick and after the vacuum molding operation, the portion 24 will have a thickness between .050 and .070 inch adjacent the ridge 22. After the housing is formed the window-receiving opening 26 is punched from the portion 24.

The rectangular window-receiving opening 26 is defined in the wall 16 by a pair of parallel, spaced, lateral edges 28.

The opening 26 is also defined by a lower end edge 30 and an upper end edge 32 which are perpendicularly related to the lateral edges 28. The ridge 22 is sufficiently spaced from the lateral and end edges of the opening 26 whereby the remaining portions 24 adjacent the ridge form a lip adjacent the edges. It will be appreciated that the rectangular ridge 22 completely circumscribes the window-receiving opening 26 and will serve to strengthen the front wall member 16 and maintain the planar configuration of the lip portions 24.

The wall portion 24 adjacent the opening lower edge 30 is notched at the lateral edges 28 to define notches 34, FIGS. 2 and 9, which are necessary to permit insertion of the window member. The notches 34 intersect the lower opening edge 30 and extend along the vertically disposed lateral portions 24 a relatively limited extent. The window member 36, employed in the embodiment of FIGS. 1 through 9, is of a molded form preferably constructed of a substantially rigid, transparent, synthetic, plastic material such as clear acrylic resin. While the window member 36 is capable of limited deformation without fracture, the material of the window member is not capable of the degree of deformation of the material of the meter housing. The window member 36 is of a rectangular configuration having lateral edges 38 defining a width greater than the width separating the opening lateral edges 28, but less than the distance separating the vertically disposed portions 40 of the ridge 22. The window member 36 includes an upper end edge 42 and a lower end edge 44 which are separated by a distance greater than the distance separating the opening end edges 30 and 32, but less than the distance separating the upper ridge portion 46 and lower ridge portion 28.

The window member 36 is of a planar configuration and is completely transparent. The lateral edges 38 of the window member include a portion 50 perpendicularly disposed to the plane of the window and a portion 52 depending from the portion 50 disposed parallel to the plane of the window. The planar window portion and the portion 52 are spaced relative to each other to define an elongated groove, or recess 54, extending substantially the entire length of the lateral edges 38 of the window member. The upper edge 42 of the window member includes a portion 56 and a portion 58 defining a groove, or recess 60, in the upper edge of the window member having converging sides.

As best appreciated from FIGS. 3 and 6, an inwardly extending rib 62 is defined adjacent the window member lower end edge 44 and is spaced relative to the bottom surface 64 of the upper recess 60 wherein engagement with the lower window-receiving opening end edge 30 occurs when the window is fully assembled within the opening.

From FIG. 3, it will be noted that the portions 50 and 52, defined on the lateral edges of the window member, do not extend the full length of the window lateral edges 38. Arcuate portions 66 of a convex configuration are defined on the window member into which the portions 50 and 52 merge, and the rib 62 also merges into the arcuate portions 66. The portions 66 are tangent, at one point, to the outer lateral edges of the window member, FIG. 7, and are in alignment with the associated recesses 54. As will be appreciated from FIG. 2, the portions 66 have a somewhat corresponding configuration to the notches 34 defined in the lateral wall portions 24, and the maximum dimension of the window-receiving opening 26, as defined by the notches 34, is substantially equal to the width of the window member 36.

The width of the window member recesses 54 adjacent the upper edge 42 is increased slightly, with respect to the remaining width of the lateral edge recesses, to facilitate assembly of the window member to the meter housing. Such an increase in the width of the recesses 54 may be accomplished by providing a relief portion 68, FIGS. 3 and 8, within each of the recesses.

The wall member lip portions 24 adjacent the opening lateral edges 28 are provided with a plurality of raised dimples, or offset projections 70, formed from the material of the lip portions. The projections 70 are deformable and their dimension in the direction of the thickness of the associated lip portion 24 is substantially equal to, or slightly greater than, the width of the recesses 54 between portions 52 and the plane of the window member. The reception of the projection 70 into the recesses 54 causes the projections to be compressed and deformed whereby a firm interconnection between the window member 36 and wall member 16 is accomplished. The projections are defined immediately adjacent the opening lateral edges 28 as to be contiguous thereto.

To insert the window member 36 into the opening 26, the window member is aligned with the opening wherein the recesses 54 of the window member are disposed in substantial alignment with the lateral edges 28 of the opening, and the upper ends of the window member recesses 54 are inserted into the notches 34. Due to the lower ridge portion 48, which extends outwardly with respect to the lateral edges 28, it is not possible, of course, to directly align the lateral edges 28 with the window member recesses 54 in a parallel manner, and the window member will, therefore, extend over the ridge portion 48 in an oblique manner relative to the wall 16 when the upper end of the recesses are inserted in the notches. When the upper ends of the window member lateral recesses 54 are placed within the notches 34, the relief portions 68 will provide sufficient clearance to permit the window member lateral recesses to receive the wall member lip portions 24 as the window member 36 is pushed in the direction of the arrow in FIG. 9. As the window member is pushed in the direction indicated in FIG. 9, the window member slides along the lateral edges of the window opening, whereby the recesses 54 receive the lateral lip portions 24. The assembly of the window member and meter housing is possible because of the deformation occurring in the wall member 16 and to some extent, the deformation produced in the window member 36, due to the fact that the lower ridge portion 48 and the configuration of the wall member 16 does not permit a direct parallel alignment of the window member recesses 54 with the wall member opening edges 28, note FIG. 9. The window member 36 will tend to push the ridge portion 48 downwardly, as represented in FIG. 9, and bend the ridge portions 40 adjacent the ridge portion 48 upwardly, as well as bend the lip portions 24 adjacent the notches 34 in an upward direction, FIG. 9. The bending of the portions of the housing wall 16 produces most of the necessary deformation to permit the assembly of the wall member and window member. However, the window member 36 may be bent a limited degree during assembly.

Sliding of the window member recesses 54 relative to the opening lateral lip portions 24 continues until the upper opening end edge 32 is received within the upper window member recess 60 and bottoms on surface 64, as shown in FIG. 4. This abutting relationship will terminate movement of the window member relative to the housing wall member 16 and, as the rib 62 may now abut the opening edge 30, FIG. 6, the window member 36 will assume its normal, planar configuration, and the deformation produced in the wall member 16 during assembly no longer occurs. When fully assembled within the window-receiving opening 26, the window member 36 assumes the relationship shown in FIGS. 2, 4 through 7, and 8. As the window member is being inserted in the opening, the lateral recesses 54 will compress the projections 70 whereby a firm and relatively tight connection between the lateral edge lip portions 24 and the lateral edges of the window member will occur and, thus, prevent the window from rattling relative to the wall member 16. The arcuate portions 66 will be received within the notches 34 on complete assembly of the window member and housing, as is apparent in FIGS. 2 and 7. It will be appreciated from FIGS. 4 through 7 that the ridge 22 extends outwardly a greater distance from the configuration of the housing than the general plane of the window portion 36. Thus, the ridge 22 protects the edges of the window member and an attractive and a unitary appearance is provided, in that the edges of the window are disposed adjacent the ridge 22. The assembly of the window member and the housing is such that it is not apparent that the window could be removed from the housing.

Should it be desired to remove the window member 36 from the opening 26, it is necessary to deflect the housing and the lower portion of the window member to remove the abutting relationship of rib 62 with opening edge 30 and locate the rib above the ridge portion 48 to permit the window to be withdrawn from the opening in a manner which is the reverse of the assembly procedure. As there is considerable resistance to bending the housing wall portions and window member, relative to the ridge portion 48, to permit the rib 62 to clear the opening edge 30 and the ridge portion 48, unauthorized disassembly of the window from the meter housing is discouraged. Normally, window member removal is accomplished by simultaneously pushing outwardly on the lower window portions from the inside of the meter housing while pushing inwardly on the ridge portion 48.

A modification to the inventive concept is shown in FIGS. 10 and 11. In FIG. 10 the meter housing front wall member is shown at 72, and is formed of the same type of material as the housing 10, and includes a rectangularly disposed ridge 74 disposed about the rectangular window-receiving opening 76. When forming the wall member 72, in accord with the embodiment of FIGS. 10 and 11, by molding, the portions of the wall member adjacent the vertical ridge portions 78 are formed in a zigzag or sine wave manner such that alternately disposed portions 80 and 82 of the wall member are located on opposite sides of a common plane parallel to the plane of wall member 72. Thus, upon blanking the window-receiving opening 76 in the wall member 72 to define lateral edges 84 and end edges 86, and notching the lateral wall member portions 80 and 82 at 88 at the transitory portion of the wall member as it passes from one side of the common plane to the other, the portions 80 and 82 define a plurality of adjacent tab portions which are alternately disposed on opposite sides of a common plane, which is the plane in which the window member is received.

As will be apparent from FIGS. 10 and 11, the window member 90 is of a rectangular, planar configuration having lateral edges 92 and end edges 94. As in the previously described embodiment, the window member is formed of a transparent acrylic resin. Assembly of the window member 90 within the window opening 76 is accomplished by inserting an end of the window member under the "outer" tab portions 80', FIG. 10, dipsosed closest the end ridge portion 96, for instance. The window member is then forced in a longitudinal direction whereby the lateral edges 92 of the window member will be received within the associated recess defined by the alternately disposed tab portions 80 and 82 located adjacent a common ridge portion 78. The deformable character of the material of the wall member permits the necessary deformation of the tab portion 80 and ridge portion 96 to accomplish the assembly of the window member within the window-receiving opening, and upon the leading end edge 94 of the window member substantially engaging the upper ridge portion 98, the other end edge 94 of the window member will clear the ridge portion 96 that the window member may be completely located within the ridge 74 and opening 76 and complete the installation. As the ridge portions 78, 96 and 98 are in alignment with the plane of the window member 90, it will be appreciated that the ridge 74 will prevent the window member from being removed from the recesses defined by the lip portions 80 and 82 unless the housing member is deformed sufficiently to permit an end of the window member to be forced outwardly to clear the associated end ridge portion.

It will be appreciated that in the practice of the invention, a window may be readily assembled into a meter housing to produce an attractive appearing assembly. With previous devices of this type, the transparent window has usually been cemented into place and replacement of the window, due to breakage or the like, has necessitated extensive repair and time-consuming procedures. The window of the invention may be quickly inserted into the window-receiving opening, and may be readily removed therefrom if access is had to the inside of the meter housing whereby an outward force may be exerted on the window member at the same time deformation of the housing wall member is produced by pushing inwardly on the ridge portion 48, for instance, that the window member may clear the ridge portion and associated window-receiving opening edges to permit the window member to be withdrawn from the opening.

It is to be appreciated that various modifications to the invention may be apparent to those skilled in the art without departing from the spirit and scope thereof, and it is intended that the invention be defined only by the scope of the following claims.

We claim:

1. A meter housing comprising, in combination, a housing at least partially defined by a wall member, said housing wall member being formed of a relatively stiff, synthetic, plastic material capable of resilient deformation and having a window member receiving opening defined therein within the configuration thereof, said opening including a pair of spaced, substantially parallel, lateral edges, a transparent window formed of a substantially rigid material capable of limited resilient bending deformation, said window member including a pair of spaced, substantially parallel, lateral edges, a first end edge and a second end edge, window member retaining means defined on at least one of said members adjacent the associated lateral edges thereof forming an elongated recess adjacent and parallel to each associated lateral edge adapted to receive a lateral edge of the other member, said recesses lying within the configuration of the associated member, window member end edge retaining means defined on said wall member adapted to align with said window member end edges upon said window member being completely located within said opening to prevent movement of said window in the longitudinal direction of said recesses, said window member being installed in said opening by alignment and sliding reception of the lateral edges of said other member within said recesses causing deformation of said wall member during window member installation, said deformation being removed upon complete installation of said window member in said opening when said end edge retaining means align with said member end edges.

2. In a meter housing as in claim 1 wherein said wall member and said window member are of a generally planar configuration, ridge portions defined on said wall member from the material thereof, said ridge portions being in alignment with said opening and transversely disposed to said opening lateral edges.

3. In a meter housing as in claim 2 wherein said ridge portions comprise said window member edge retaining means.

4. In a meter housing as in claim 1 wherein said wall member and said window member are of a generally planar configuration, a ridge defined on said wall member from the material thereof, said ridge being of a continuous configuration corresponding to the configuration of said window member receiving opening and adjacently disposed to and circumscribing said opening.

5. In a meter housing as in claim 1 wherein said wall member is formed of acrylonitrile butadine styrene and said window member is formed of transparent acrylic resin.

6. In a meter housing as in claim 1 wherein said window member receiving opening includes a first end edge and a second end edge, said window member retaining means comprising an elongated recess defined in each lateral edge of said window member adapted to receive a lateral edge of said opening, a notch defined in each lateral edge of said opening adjacent said opening first end edge, said notches defining a clearance of sufficient width to permit alignment and entry of said opening lateral edges into said window member recesses.

7. In a meter housing as in claim 6 wherein a recess is defined in said second end edge of said window member adapted to receive said opening second end edge upon said window member being completely installed within said opening, and recess merging means defined on said window member lateral edges adjacent said window member first end edge and in alignment with said recesses defined in said window member lateral edges, said recess merging means each being received within an opening notch upon said window member being completely installed within said opening.

8. In a meter housing as in claim 6 wherein at least one deformable projection is defined from the material of said wall member contiguous to each of said opening lateral edges, said projections having a dimension in the direction of the thickness of said wall member greater than said thickness and slightly greater than the transverse width of said recess defined in said window member lateral edges whereby reception of said projections within said window member recesses compresses said projections forming a firm interconnection between said opening lateral edges and said window member lateral edges.

9. In a meter housing as in claim 1 wherein said window retaining means includes a recess defined on said wall member adjacent each of said opening's lateral edges, said recesses being defined by a plurality of adjacent tab portions defined on said wall member from the material thereof, adjacent tab portions being alternately disposed in opposite directions with respect to a common plane parallel to the general plane of said wall member, whereby said adjacent tab portions are disposed on opposite sides of a planar window member received within said recesses.

10. In a meter housing as in claim 9 wherein said window member receiving opening includes end edges and said window member end edge retaining means comprises a ridge defined from the material of said wall member adjacent each of said opening end edges and in planar alignment with said lateral edge recesses defined by said tab portions, said ridges at opposite ends of said opening being spaced apart a distance slightly greater than the distance separating said window member first and second end edges, whereby said window member is received therebetween and said window member end edges align with said ridges at opposite ends of said opening upon installation of said window member in said opening.

No references cited.

THERON E. CONDON, *Primary Examiner.*

JAMES B. MARBERT, *Examiner.*